United States Patent [19]

Nakajima et al.

[11] Patent Number: 4,852,693
[45] Date of Patent: Aug. 1, 1989

[54] LUBRICATION MONITORING APPARATUS FOR MACHINE

[75] Inventors: Yoshiaki Nakajima, Yono; Tadashi Suzuki, Machida; Yoneji Wada, Urawa, all of Japan

[73] Assignee: Takano Corporation, Saitama, Japan

[21] Appl. No.: 229,135

[22] Filed: Aug. 5, 1988

[30] Foreign Application Priority Data

Aug. 18, 1987 [JP] Japan .................. 62-203426

[51] Int. Cl.[4] ............. F01M 1/18; F01M 11/10; F01M 9/10; F01M 11/06
[52] U.S. Cl. .................. 184/6.4; 184/108; 184/6.14
[58] Field of Search .............. 184/6.4, 108, 6.14, 184/6.22

[56] References Cited

U.S. PATENT DOCUMENTS

| | | | |
|---|---|---|---|
| 1,359,944 | 11/1920 | Witham, Jr. ............... | 184/6.4 |
| 2,143,533 | 1/1939 | Archea et al. .............. | 184/6.4 |
| 3,090,365 | 5/1963 | Constantino ............... | 184/6.22 |
| 3,497,034 | 2/1970 | Eddy, Jr. .................. | 184/6.4 |
| 3,876,037 | 4/1975 | Rath, Jr. .................. | 184/6.4 |
| 4,059,087 | 11/1977 | Tanigami et al. ........... | 184/6.4 |
| 4,444,292 | 4/1984 | Brown et al. .............. | 184/6.4 |
| 4,527,661 | 7/1985 | Johnstone et al. .......... | 184/6.4 |
| 4,629,334 | 12/1986 | Hochstein ................. | 184/108 |

FOREIGN PATENT DOCUMENTS

| | | | |
|---|---|---|---|
| 220164 | 4/1987 | European Pat. Off. ....... | 184/6.4 |
| 3520126 | 12/1986 | Fed. Rep. of Germany ... | 184/6.4 |
| 8213 | 1/1983 | Japan ..................... | 184/6.4 |

Primary Examiner—Henry A. Bennet
Assistant Examiner—Denise L. Ferensic
Attorney, Agent, or Firm—Bierman and Muserlian

[57] ABSTRACT

A lubrication monitoring apparatus for a machine, in which an oil pressure gauge detects the pressure of lubricating oil of the filter, a first oil thermometer detects the temperature of lubricating oil before lubricating the mechanical section, a second oil thermometer detects the temperature of lubricating oil in the vicinity of the outlet of the lubricated mechanical section, and a warning device gives warning when any of the oil pressure, oil temperature, and oil temperature difference is out of a predetermined range.

9 Claims, 2 Drawing Sheets

LUBRICATION MONITORING APPARATUS FOR MACHINE

FIELD OF THE INVENTION

This invention relates to a lubrication monitoring apparatus for a machine, which, in addition to cleaning of lubricating oil as provided by a conventional art oil cleaner, monitors the filter for clogging, viscosity of lubricating oil, and lubricated mechanical components for abrasion, so that the machine using lubricating oil always operates at its full performance.

BACKGROUND OF THE INVENTION

Heretofore, an oil cleaner has been considered as one which is only to clean lubricating oil, and has been improved in terms of performance of this point.

In fact, recently, in compliance with social requirements for clean environment and with a rapid improvement in filter materials, a deep-layer type filter has been developed which has a considerably higher de-contamination capability than conventional art filters and can provide lubricating oil with an extremely high cleanliness.

In the deep-layer type filter, coarse contaminants are caught by a filter layer located near the inlet and fine contaminants are caught by a filter layer located near the outlet, so that coarse to fine contaminants are caught by different filter layers according to the particle size of contaminants. Therefore, compared with conventional art filters, the deep-layer type filter has an extremely high de-contamination capability so that large amounts of coarse to fine contaminants can be removed, with an extended service life. FIG. 3 is a graph showing changes in flow-rate characteristics Q and pressure characteristics P with time in the de-contamination operation of the deep-layer type filter. As shown in the figure, since contaminants are distributed over the individual layers according to the particle size, a partially clogged state continues for a substantially long period of time, with slight changes in both flow rate and pressure, until a clogging point A at which clogging spreads over the entire filter. After the clogging point A, the flow rate decreases rapidly and the pressure increases rapidly.

However, only a high cleanliness of lubricating oil is not sufficient for machine lubrication. For example, if the flow rate of lubricating oil is decreased by clogging of the filter, the fluid lubricating condition is destroyed, resulting in a boundary lubricating state or a mixed lubricating state, metal abrasion will occur in the lubricated section of the machine and, in the worst case, sticking may result.

Further, if the viscosity of lubricating oil changes due to a change in ambient temperature, the fluid lubricating condition will be destroyed and, in the worst case, sticking will also result.

On the other hand, viewing from the operating condition of the machine, there are inevitable special operating conditions such as start-up operation, heavy-load operation, repeated load operation, and low-speed operation, other than normal operating condition. Under such special operating conditions of the machine, or in transition from normal operating conditions to the special operating conditions, the fluid lubricating condition tends to be destroyed, resulting in metal abrasion and, in the worst case, an accidental sticking.

Therefore, to operate a machine using lubricating oil under the best condition, the flow rate and viscosity of lubricating oil and abrasion of lubricated parts must be monitored. However, as described previously, the prior art oil cleaner had only the oil cleaning function.

Decreased flow rate due to filter clogging may be recovered by replacing the filter. However, since the deep-layer type filter has a considerably higher de-contamination capacity than the prior art filter, it can collect far greater amounts of contaminants in it and, when the collected contaminants reach a specific amount (point A in FIG. 3), the flow rate rapidly decreases. Therefore, it is difficult to determine the time for replacement, and not so easy as is the prior art filter.

The prior art filter also shows flow rate decrease and pressure increase characteristics similar to those shown in FIG. 3 but, since it cannot remove fine contaminants, contamination of lubricating oil increases before complete clogging of the filter. Thus, the degree of contamination of lubricating oil has been checked and both the filter and lubricating oil have been changed.

However, for the case of the deep-layer type filter, because it can output highly cleaned lubricating oil even in the clogged state, if the time for replacement is determined from the degree of contamination, there is a danger of a sudden drop in flow rate of lubricating oil. Therefore, with an oil cleaner using the deep-layer type filter, the filter has been changed periodically at an earlier time to prevent occurrence of such a sudden drop in flow rate, thus resulting in an excessive, uneconomical maintenance.

With a view to obviate all of the prior art defects of oil cleaners, it is a primary object of the present invention to provide an apparatus for supplying lubricated section with lubricating oil with an extremely high cleanliness and monitoring continuously for clogging of a filter, lubricating oil viscosity, and abrasion of lubricated mechanical section, to maintain the best operating condition of a machine.

SUMMARY OF THE INVENTION

In accordance with the present invention which attains the above object, there is provided a lubrication monitoring apparatus for a machine comprising a pump for pumping lubricating oil with a constant flow rate from a lubricating oil reservoir of the machine, a filter for removing contaminants from lubricating oil outputted from the pump, an oil supply device for supplying lubricated mechanical section with lubricating oil cleaned by the filter, and an oil discharge device for discharging lubricating oil passed through the lubricated mechanical section to the lubricating oil reservoir, and further comprising an oil pressure gauge for detecting pressure of lubricating oil inputted from the pump to the filter, a first oil thermometer for detecting temperature of lubricating oil at an adequate position between the lubricating oil reservoir and an inlet of the lubricated mechanical section, a second oil thermometer for detecting temperature of lubricating oil in the vicinity of an outlet of the lubricated mechanical section, a differential oil temperature detecting device to obtain difference in temperature from values detected by the first and second oil thermometers, and a warning device for giving warning when any of detected values of the oil pressure gauge, the first oil thermometer, and the differential oil temperature detecting device is out of a predetermined value.

The pump supplies the filter with lubricating oil, the filter cleans the lubricating oil to a high cleanliness, and the cleaned lubricating oil is supplied to the lubricated mechanical section through the oil supply device.

The oil pressure gauge is to check the filter for clogging. Referring to FIG. 3, since the pressure at the inlet of the filter increases approximately in inverse proportion to the flow rate, the filter can be determined as close to clogging when the pressure exceeds a specific value (reference value). The reference value is a value which is reached before a sudden drop in flow rate, and is previously determined experimentally. However, since a pressure fluctuation occurs if the flow rate of the pump fluctuates, the pump must be kept at a constant flow rate.

The first oil thermometer is to monitor the viscosity of lubricating oil. Since viscosity of lubricating oil is given as a function of oil temperature, lower temperatures giving higher viscosities and higher temperatures giving lower viscosities, an abnormal viscosity can be determined when the temperature is out of a temperature range which is determined by a lower reference value and a higher reference value, or by only a lower reference value, or by only a higher reference value. The lower and higher reference values are also determined previously through experiments.

The second oil thermometer and the differential oil temperature detecting device cooperate with the first oil thermometer to monitor the lubricated mechanical section for abrasion. If the fluid lubricating condition at the lubricated mechanical section is destroyed resulting in a boundary lubricating condition or a mixed lubricating condition, a metal abrasion will result. In an initial stage, the metal abrasion is localized and, since it recovers in a short time, has been difficult to be detected. However, since temperature of the worn part reaches hundreds of degrees C and most of generated heat is dissipated into lubricating oil, the oil temperature increases for only a short period of time. With an eye on the fact, other than the temperature on the peripheral parts such as walls of the lubricated mechanical section, the temperature of lubricating oil itself in the vicinity of the outlet can be detected by the second oil thermometer to determine a metal abrasion when the temperature exceeds a specific value. Further, to remove effects of external interference such as fluctuation in ambient temperature, difference in temperature is calculated with respect to the value detected by the first oil thermometer and, when the difference in oil temperature exceeds a predetermined value (reference value), it is judged as occurrence of a metal abrasion. The reference value is also determined previously through experiments.

The warning device gives warning when filter clogging, a change in lubricating oil viscosity, or occurrence of abrasion in the lubricated mechanical section is determined by the above described principle, to urge replacement of the filter or interruption of machine operation.

The oil supply device depends on the type of lubricating system of the machine, a serial supply type and a parallel supply type.

In the serial supply type system, lubricating oil from the filter is directly supplied to the lubricated mechanical section through a pipe or a hose.

In the parallel supply type system, lubricating oil from the filter is once returned to the lubricating oil reservoir, and then pumped by a separate pump and supplied to the lubricated mechanical section.

BRIEF DESCRIPTION OF THE DRAWINGS

FIG. 3 is a graph showing operation characteristics of a filter.

DESCRIPTION OF PREFERRED EMBODIMENTS

Figure 1:
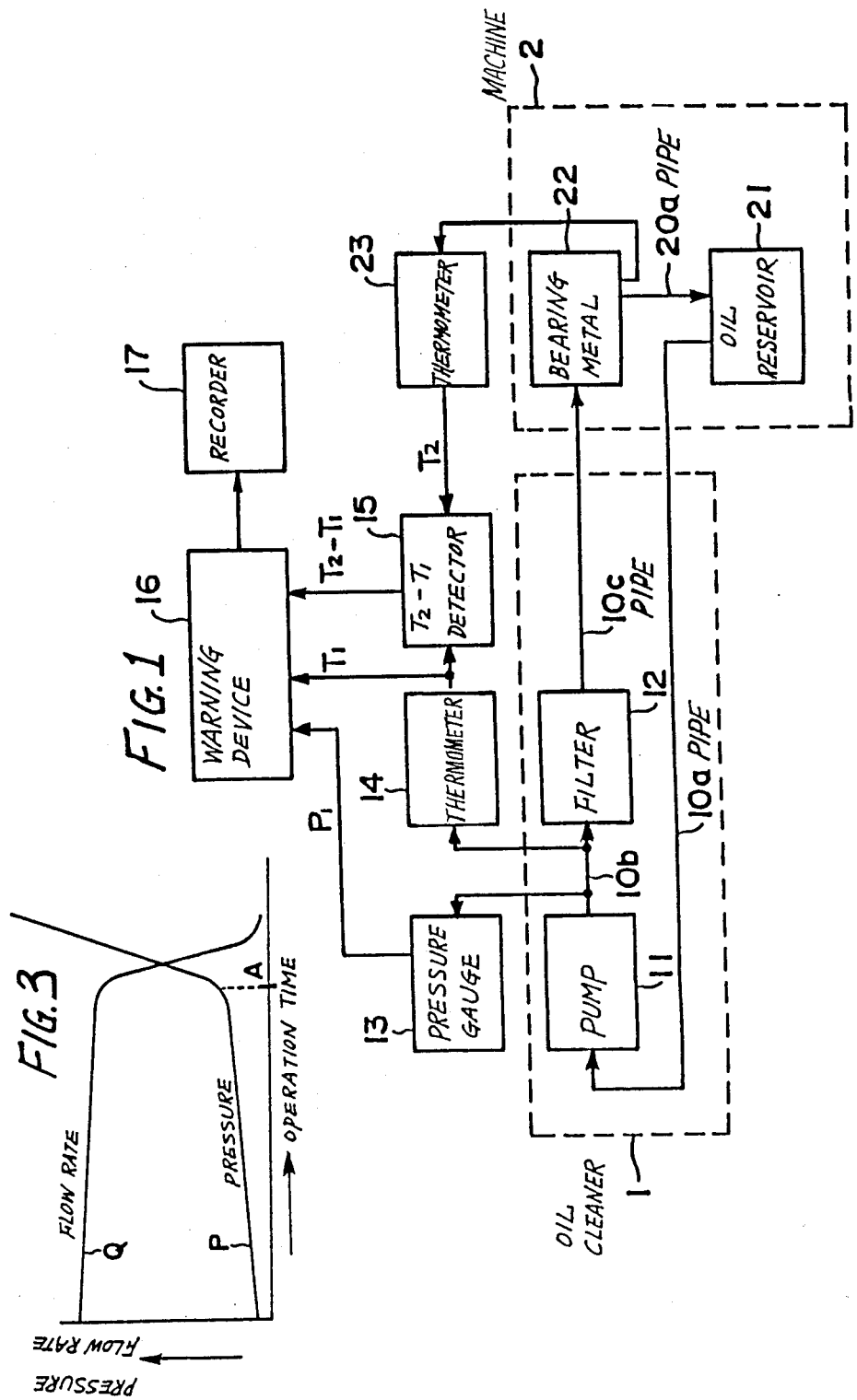
FIG. 1 and FIG. 2 are diagrams showing the structure of embodiments of the present invention.

Preferred embodiments of the present invention will now be described with reference to the drawings. FIG. 1 is a diagram showing an embodiment of the present invention, applied to a serial supply type machine lubricating system. Referring to FIG. 1, a pump 11 of an oil cleaner is of a constant flow type, of which an inlet is connected to a lubricating oil reservoir 21 of a machine 2 through a pipe 10a, an outlet of the pump 11 is connected to an inlet of a filter 12 through a pipe 10b, and an outlet of of the filter 12 is connected to an inlet of a lubricated mechanical section 22 (e.g. bearing metal) through a pipe 10c as an oil supply device. An outlet of the lubricated mechanical section 22 is connected to the lubricating oil reservoir 21 through a pipe 20a as an oil discharge device. The filter 12 is not limited to a deep-layer type filter or a conventional art filter, various other types can be used.

An oil pressure gauge 13 is connected to the pipe 10b between the pump 11 and the filter 12, and the pipe 10b is connected with a first oil thermometer 14. A second oil thermometer 23 has a very small detection element so that it can directly measure the temperature of lubricating oil outputted from the lubricated mechanical section 22, and the detection element is disposed in the interior of the outlet of the lubricated mechanical section. The output of the first oil thermometer 14 and that of the second oil thermometer 23 are applied to a differential oil temperature detecting device 15, and the output of the differential oil temperature detecting device 15 is supplied to a warning device 16. The output of the oil pressure gauge 13 and that of the first oil thermometer 14 are also supplied to the warning device 16.

Operations of this embodiment will now be described. First, as a lubricating operation, the pump 11 pumps up lubricating oil at a constant flow rate and feeds it to the filter 12, and the filter 12 removes contaminants. The thus highly cleaned lubricating oil passes through the pipe 10c to the lubricated mechanical section 22 and, after the lubrication, returns back to the lubricating oil reservoir 21.

Next, as a warning operation, the oil pressure gauge 13 detects an oil pressure P1 in the pipe 10b connected to the inlet side of the filter 12, the warning device 16 compares the detected $P_1$ with a reference value $P_{ref}$ and, if $P_{1l} > P_{ref}$, gives warning that the filter 12 is about to be clogged.

The first oil thermometer 14 detects an oil temperature $T_1$ in the pipe 10b, and the warning device 16 compares the detected $T_1$ with upper and lower reference values $T_{1max}$ and $T_{1min}$ ($T_{1max} > T_{1min}$). If $T_1 > T_{1max}$ or $T_1 < T_{1min}$, the warning device 16 gives warning of an abnormal viscosity. It is not always necessary to set both the upper and lower reference values, but only one of them may be set.

The second oil thermometer 23 detects an oil temperature $T_2$ in the outlet of the lubricated mechanical section 22, and the differential oil temperature detecting device 15 calculates a difference $T_2-T_1$ between the oil temperature $T_2$ and the oil temperature $T_1$ detected by the first oil thermometer 14. The warning device 16 compares the oil temperature difference $T_2-T_1$ with a reference value Tref and, if $T_2-T_{1l} > Tref$, gives warning on occurrence of a metal abrasion.

Further, in this embodiment, a recorder 17 is connected to the warning device 16 to record with time on a recording paper every time a metal abrasion, that is $T_2-T_1 > T_{ref}$, is detected in the lubricated mechanical section 22, and the oil pressure $P_1$, the oil temperature $T_1$, and the oil temperature difference $T2-T_1$ are also recorded at given intervals, thereby giving a clear indication of occurrence of a metal abrasion.

Next, another embodiment of the present invention will now be described with reference to FIG. 2. The embodiment shown in FIG. 2 is a parallel supply type machine lubrication system to which the present invention is applied, and is the same as the embodiment shown in FIG. 1 except for an oil supply device which is disposed between the filter 12 and the lubricated mechanical section 22.

In the embodiment in FIG. 1, the oil supply device is the pipe 10c, and clean lubricating oil is supplied from the filter 12 directly to the lubricated mechanical section 22.

Figure 2:
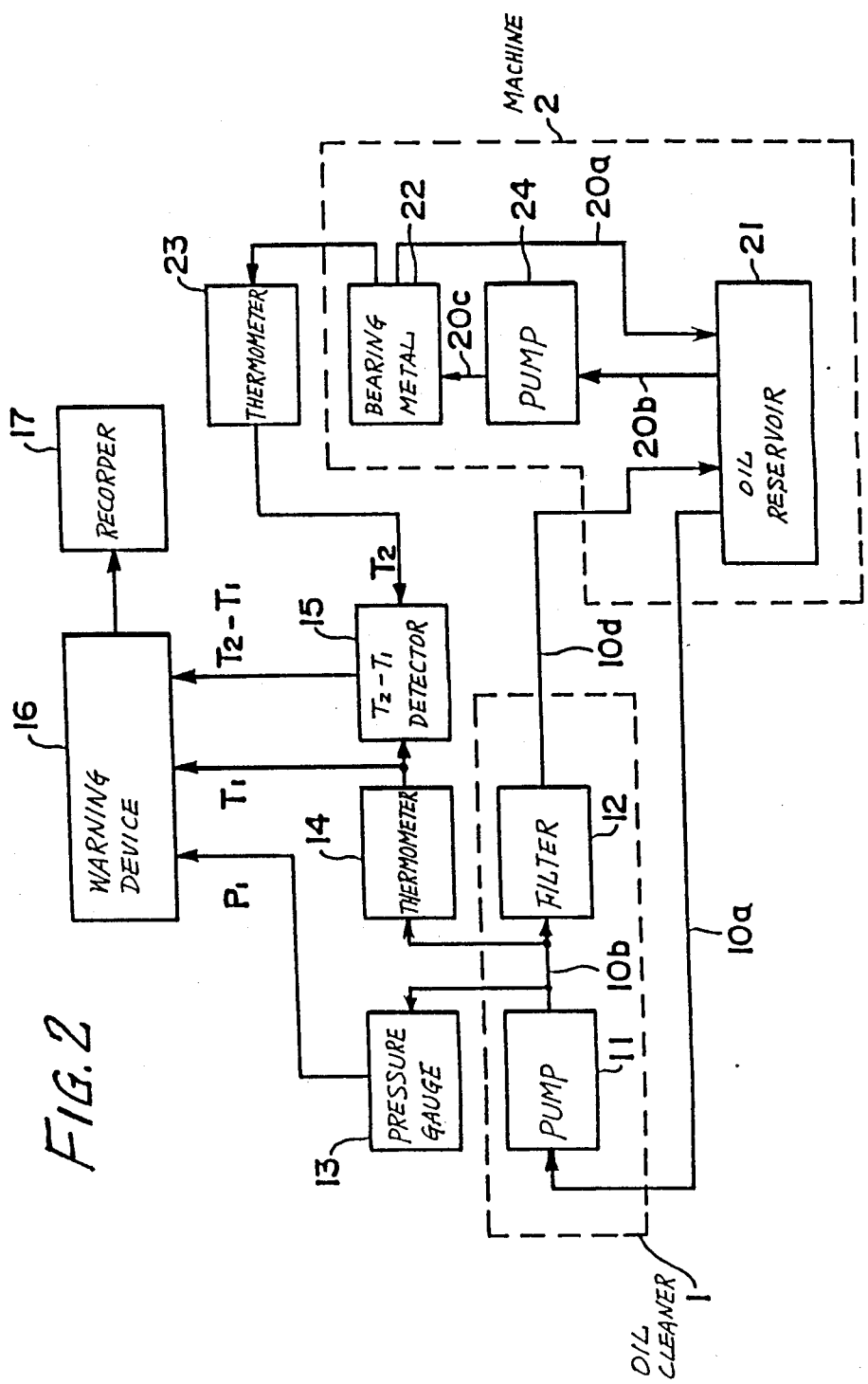

In the embodiment in FIG. 2, on the other hand, the outlet of the filter 12 is connected to the lubricating oil reservoir 21 through a pipe 10d, an inlet of a separate pump 24 is connected to the lubricating oil reservoir 21 through a pipe 20b, and an outlet of the pump 24 is connected to the inlet of the lubricated mechanical section 22 through a pipe 20c. Other components of the embodiment in FIG. 2 are same as those of the embodiment in FIG. 1, and same components are indicated with same reference number and same description will be omitted.

In the above-described embodiments, the oil pressure gauge 13 is connected to the pipe 10b, however, alternatively, the oil pressure gauge 13 may be built in the inlet of the filter 12 or the outlet of the pump 11.

The first oil thermometer 14, other than to the pipe 10b, may also be connected at any position in the oil passage between the interior of the lubricating oil reservoir 21 to the inlet of the lubricated mechanical section 22, for example, the pipe 10c or 10d.

Further, the detection element of the second oil thermometer 23 is preferably to be located inside the outlet of the lubricated mechanical section 22, but alternatively may be disposed in the pipe 20a, as far as not so far away from the outlet.

In addition to the reference values $P_{ref}$, $T_{1max}$, $T_{1min}$, and $T_{ref}$, other reference values inside the above individual reference values can be set to the warning device 16, to detect filter clogging, a change in lubricating oil viscosity, or occurrence of a metal abrasion at an earlier time and give a preliminary warning.

With the present invention, a filter such as of a deep-layer type can always be used to supply the lubricated mechanical section with extremely clean lubricating oil.

Moreover, since the pressure of lubricating oil inputted from the pump to the filter is detected by the oil pressure gauge and the detected oil pressure is used to monitor the filter for clogging, the filter can be positively determined if it is close to clogging before occurrence of a sudden drop in flow rate of lubricating oil.

Further, since the present invention uses the first oil thermometer to detect the temperature of lubricating oil inputted to the lubricated mechanical section and uses the detected oil temperature to monitor the viscosity of lubricating oil, an abnormal viscosity can be checked positively.

Furthermore, since the second oil thermometer is used to detect the temperature of lubricating oil itself in the vicinity of the outlet of the lubricated mechanical section and the difference between the temperatures detected by the first and second oil thermometers is used to check for occurrence of an abrasion in the lubricated mechanical section, occurrence of an abrasion can be checked positively in an earlier stage.

As described above, the present invention, not only cleaning of lubricating oil, but comprehensively monitors filter clogging, lubricating oil viscosity, and abrasion in lubricated mechanical section, and gives warning, thereby maintaining the best operating conditions of a machine which uses lubricating oil.

We claim:

1. A lubrication monitoring apparatus for a machine comprising a pump for pumping lubricating oil with a constant flow rate from a lubricating oil reservoir of the machine, a filter for removing contaminants from lubricating oil outputted from said pump, an oil supply device for supplying lubricated mechanical section with lubricating oil cleaned by said filter, and an oil discharge device for discharging lubricating oil passed through said lubricated mechanical section to said lubricating oil reservoir, and further comprising an oil pressure gauge for detecting pressure of lubricating oil inputted from said pump to said filter, a first oil thermometer for detecting temperature of lubricating oil at an adequate position between said lubricating oil reservoir and an inlet of said lubricated mechanical section, a second oil thermometer for detecting temperature of lubricating oil in the vicinity of an outlet of said lubricated mechanical section, a differential oil temperature detecting device to obtain difference in temperature from values detected by said first and second oil thermometers, and a warning device for giving warning when any of detected values of said oil pressure gauge, said first oil thermometer, and said differential oil temperature detecting device is out of a predetermined value.

2. A lubrication monitoring apparatus for a machine as claimed in claim 1, wherein said first oil thermometer is connected to an oil passage between said filter and said pump.

3. A lubrication monitoring apparatus for a machine as claimed in claim 1, wherein lubricating oil from said filter is supplied directly to said lubricated mechanical section.

4. A lubrication monitoring apparatus for a machine as claimed in claim 1, wherein lubricating oil from said filter is once returned to said lubricating oil reservoir, and lubricating oil is pumped from said lubricating oil reservoir by a separate pump and supplied to said lubricated mechanical section.

5. A lubrication monitoring apparatus for a machine as claimed in claim 1, wherein said filter is a deep-layer type filter.

6. A lubrication monitoring apparatus for a machine as claimed in claim 1, wherein said warning device is connected with a recorder to make a recording when difference in lubricating oil temperature exceeds a reference value.

7. A lubrication monitoring apparatus for a machine as claimed in claim 1, wherein said warning device is connected with a recorder to record lubricating oil pressure, lubricating oil temperature, and difference in lubricating oil temperature at predetermined time intervals.

8. A lubrication monitoring apparatus for a machine of claim 2 wherein lubricating oil from said filter is supplied directly to said lubricated mechanical section.

9. A lubrication monitoring apparatus for a machine of claim 2 wherein lubricating oil from said filter is once returned to said lubricating oil reservoir and lubricating oil is pumped from said lubricating oil reservoir by a separate pump and supplied to said lubricated mechanical section.

* * * * *